United States Patent [19]

Ziaylek, Jr.

[11] 4,339,064
[45] Jul. 13, 1982

[54] CARRIER CLAMP FOR FIRE LADDERS

[76] Inventor: Theodore Ziaylek, Jr., 140 Riverview Dr., Yardley, Pa. 19067

[21] Appl. No.: 196,949

[22] Filed: Oct. 14, 1980

[51] Int. Cl.³ .............................................. B60R 9/04
[52] U.S. Cl. .................................... 224/324; 224/917; 211/60 R
[58] Field of Search ................. 224/42.45 R, 324, 325, 224/326, 331, 321, 323, 917; 269/254 R; 280/4, 769; 211/60 R, 60 SK; 248/316 R, 316 C, 316 E, 316 F

[56] References Cited

U.S. PATENT DOCUMENTS

| 2,173,953 | 9/1939 | Schwisow | 211/60 R |
| 2,321,018 | 6/1943 | Dowd | 211/64 |
| 2,840,288 | 6/1958 | Broddon | 224/324 X |
| 3,307,759 | 3/1967 | Fulton | 224/917 X |
| 3,877,624 | 4/1975 | Carson | 224/42.1 F |

FOREIGN PATENT DOCUMENTS 1290264  3/1962  France .............................. 224/323

OTHER PUBLICATIONS

Duo Safety Ladders, Catalog No. 678, p. 16.

Primary Examiner—Steven M. Pollard
Attorney, Agent, or Firm—Frederick A. Zoda; John J. Kane; Albert Sperry

[57] ABSTRACT

A carrier clamp for fire ladders of the folding type, is adapted to be mounted upon a fire truck or the like. A pair of the clamps, when so mounted, accommodate a folding ladder of the type in which the side rails are collapsed into longitudinally contacting engagement. The clamp includes a body having a ladder-receiving recess which may open either upwardly or laterally, depending upon which of two permitted mounting arrangements is selected. The ladder-receiving recess is normally closed by a spring-biased handle, which can be swiftly grasped and pivoted to an out-of-the-way position, to permit swift removal and setting up of the ladder under emergency conditions.

The clamp device incorporates removable spacers, to adjust the sides of the ladder-receiving recess to folded ladders of differing widths. In each case, the spacer block includes a cam surface adapted to bear against the ladder when the ladder is forced against the spacer block by the spring biased handle, to hold the ladder securely.

5 Claims, 5 Drawing Figures

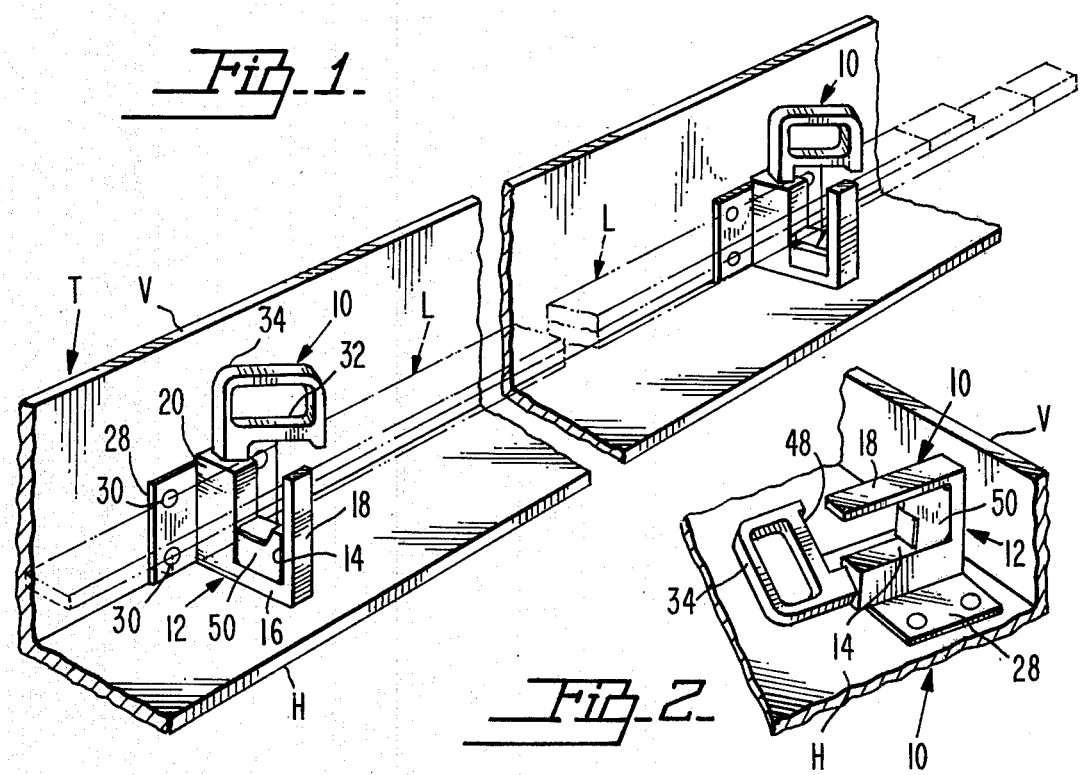
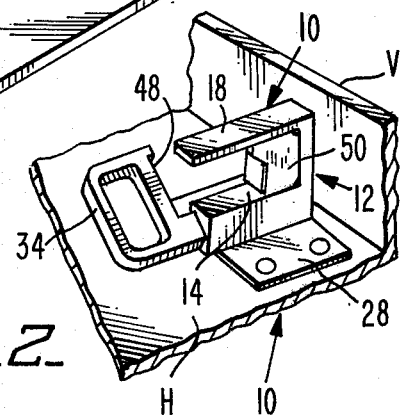
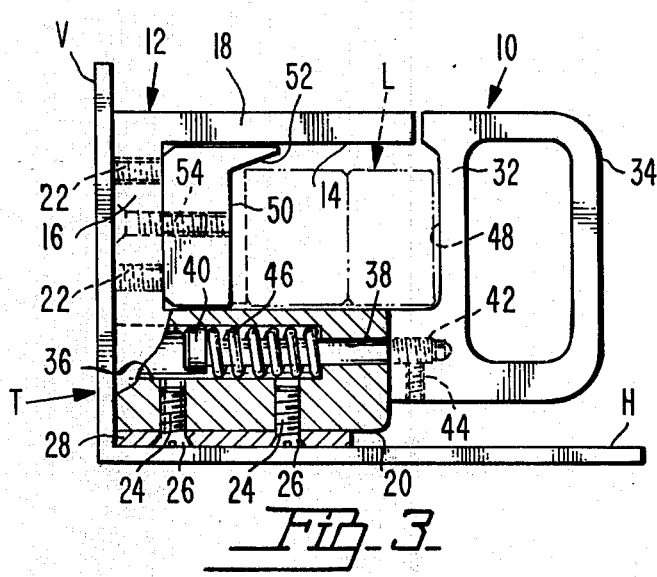
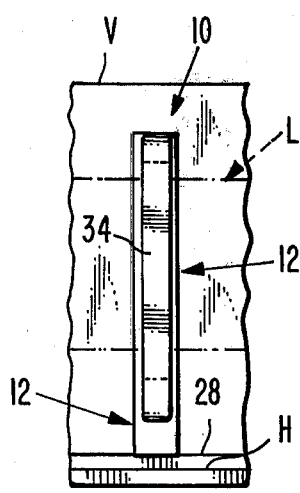
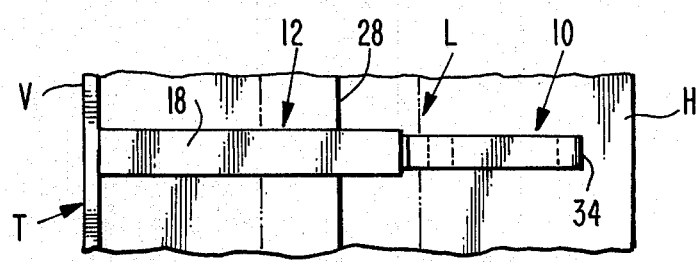

CARRIER CLAMP FOR FIRE LADDERS

BACKGROUND OF THE INVENTION

1. Field of the Invention

The present invention relates to the general field of support devices, and in particular the field of clamps or supporting brackets for removable objects. In a more particular sense, the invention comprises a clamp or bracket adapted to be swiftly and easily adjusted to a release position, so as to permit extraction of the supported object. The device is of the type, falling within this general category, in which a portion of the clamp is spring biased to close a recess in which the object is engaged, said portion being at all times adapted to be adjusted by a linear movement and a pivoted movement, in sequence, to clear the recess and permit removal of the clamped object.

2. Description of the Prior Art

It has been proposed, heretofore, to provide clamping devices for any of various elongated objects, including folding fire ladders. Some of these devices, however, have been specially designed to receive only one particular make of fire ladder, and hence have been unsuitable by reason of the fact that a fire company, in purchasing ladder clamps, may not desire to be restricted thereby to the purchase of only a single commercial make of ladder.

It is also desirable that a clamp be provided which can be manufactured and sold economically, by reason of its capability of being made in a single form, while at the same time being adapted for supporting any of various makes of fire ladders, merely by insertion or removal of selected spacer blocks.

In the prior art, also, many clamps have been excessively complicated, and cannot be opened swiftly enough to meet the demanding requirements of volunteer fire companies or paid fire departments. Ladder clamps on fire trucks must be conveniently accessible, and it is of the greatest importance that there be no loss of time, in an emergency when even seconds count, in the opening of the clamp and the resultant obtaining of access to the folded ladder.

Folding ladders of the type accommodated by truck-mounted ladder carrier clamps are regarded as highly important pieces of equipment, in that they can be carried through small spaces, are very light and can be swiftly opened and set up for use.

SUMMARY OF THE INVENTION

Summarized briefly, the invention comprises a body or base portion of block-like form, having a ladder-receiving recess opening at one end thereof. The body is adapted to be mounted upon a suitable support surface of a fire truck or other emergency vehicle. A handle is mounted on the body under spring bias tending to urge the handle to a position closing the recess, so as to cooperate with the body in confining a folded fire ladder. The handle can be pulled outwardly against the spring force linearly, to clear the supported object, and then can be rotated to a position completely clear of the recess so as to allow removal of the ladder.

A spacer block is adapted to be mounted within the recess, to reduce the depth thereof, thus to allow the device to accommodate ladders which, in their folded condition, may be of reduced width.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective view showing, fragmentarily, a portion of a fire truck, and illustrating a pair of the carrier clamps mounted thereon, the clamps being in partially opened position in supporting relation to a folded ladder illustrated in chain-dotted outline;

FIG. 2 is a perspective view illustrating, fragmentarily, a portion of an emergency vehicle and illustrating the clamp, in partially opened position, as it would appear when the recess is to open in a horizontal direction;

FIG. 3 is an enlarged view of the clamp mounted as in FIG. 2, partly in side elevation and partly in longitudinal section, the ladder being illustrated in chain-dotted outline;

FIG. 4 is a view of the clamp mounted as in FIG. 3, as seen from the right of FIG. 3; and FIG. 5 is a top plan view of the clamp illustrated in FIG. 3.

DESCRIPTION OF THE PREFERRED EMBODIMENT

For the purpose of illustrating the carrier clamp comprising the present invention, as it would appear when actually mounted upon an emergency vehicle, there has been shown in the drawing a fragmentary portion of a fire truck T. The illustrated portion of the truck T comprises a vertical wall V intersecting with a horizontal ledge H to provide a right-angled cove adapted for mounting of a pair of carrier clamps 10 formed according to the present invention. The carrier clamps would normally be mounted in pairs, spaced a substantial distance apart along the vertical wall or ledge, as shown to best advantage in FIG. 1. However, it is possible that the carrier clamps might be mounted in a set of three or more, depending upon the length of the supported ladder. Fire ladders of the type that are adapted to be supported on the vehicle by means of the carrier clamps 10 would, however, normally be of perhaps 9 to 15 feet in length, and it has been found that a single pair of the clamps would be well-suited to support such ladders.

In any event, the supported ladder has been illustrated in chain-dotted outline, and has been designated by the reference character L. Ladders of this type are adapted to be so folded as to have their side rails in direct longitudinal contact, with the rungs of the ladders completely recessed within one or both of the side rails. A typical ladder, adapted to be supported within the carrier clamps is that manufactured by the Duo-Safety Ladder Corporation of Oshkosh, Wisconsin, and is an aluminum folding ladder sold as its series 585-A. Another ladder of the folding type is made by the Aluminum Ladder Company, Florence, South Carolina, as its type FL.

Ladders of this type, made by different companies, vary with respect to their transverse, folded dimension, and hence it is important to provide carrier clamps that are adapted to be used for the greatest possible number of commercial ladders of this type, with minimum modification of the carrier clamp.

To this end, the carrier clamp 10 comprising the present invention includes an integrally formed, metal body 12, taking the form of a relatively thick, rectangular block, having a recess 14, also of rectangular form, opening inwardly from one end thereof. The recess 14 is adapted to receive the folded ladder L, as shown in FIG. 3, and the provision of the recess causes the body 12 to assume a U-shape or C-shape, depending upon whether the body is vertically mounted as in FIG. 1, or horizontally mounted as in FIG. 2.

The body, with the recess formed in it as described, thus includes an end portion 16, integral with parallel side portions 18, 20 respectively defining the respective sides of the recess 14.

The side portion 20, in a preferred embodiment, is substantially thicker than the side portion 18, resulting from the provision of the recess to one side of the longitudinal center line of the body. As will presently appear, the side portion 20 is left relatively thick for the specific purpose of accommodating a spring biased plunger extending from a pivoted handle mounted upon the body.

Formed in the end portions 16 are parallel, threaded openings 22, 22. A similar pair of threaded openings 24, 24 formed in the side portion 20 are adapted to receive threaded screws 26 for connecting the body 12 to a rectangular, flat mounting plate 28 capable of being secured to either the ledge H or the vertical wall V by mounting bolts or rivets 30.

As will be understood, the mounting plate 28 can be attached either to the side portion 20, or to the end portion 16, since the attaching screws 26 can be extended into either the openings 24 or the openings 22, according to the particular mounting selected and found the most suitable for the device upon the emergency vehicle.

Mounted upon the body 12 is a closure element 32, integrally formed to include a handle grip 34. The closure element 32, when in the position shown in FIGS. 3-5, is adjusted into the general plane of the body 12 (see FIGS. 4 and 5). When in this position, the closure element 32 closes the recess 14 and cooperates with the body in confining therein a folded ladder L.

The side portion 20 of the body 12 has formed in it an elongated, deep plunger recess 36 formed as the counterbore of a bore 38 in which is slidably and rotatably mounted an elongated, headed plunger 40, the head of which is disposed within the recess 36. Plunger 38, though freely slidable and rotatable within the bore 38, is threadedly engaged at its end, as at 42, in a threaded recess formed in the closure element 32. The plunger, when threaded into the recess 42, is securely anchored therein against rotatable movement, through the provision of a set screw 44.

Between the head of the plunger 40, and the inner end of the recess 36, a coil spring 46 surrounds the plunger, and is held under compression. The spring tends to bias the closure element toward the recess 14, so as to securely engage the ladder L in the recess. If desired, the set screw 44 can be loosened, to permit the headed plunger to be adjusted in an axial direction for the purpose of effecting adjustments in the tension of the coil spring, after which the set screw is again turned home against the plunger.

In the illustrated example, there is shown a spacer block 50 within recess 14. The spacer block may or may not be used, but is provided whenever the folded ladder L is of a width such as to require that the recess 14 be reduced in depth. The spacer block is in confronting relation to a shallow recess 48 formed in the closure element, and in the illustrated example, the spacer block at one side thereof has a forwardly projecting nose 52 formed with an inclined surface engaging the ladder L.

The spacer block, if used, is held in place by a screw 54, which extends through a smooth walled bore formed in the end portion 16, and engages in a threaded bore of the block 50.

In use of the device, it will first be noted that the carrier clamp can be mounted to cause its recess 14 to open either upwardly as in FIG. 1, or alternatively laterally as in FIG. 2. The mounting selected will be one that accommodates itself best to the needs of the firemen, or possibly to the design of the truck itself.

It will also be noted that the mounting plate 28 can be attached either to the side portion 20, or alternatively, to the end portion 16. Again, the selection of the mounting plate position depends upon the size and nature of the particular area of wall V or ledge H, to which the device is to be attached.

It is also true that the spacer block 50 can or cannot be used, again depending upon the particular ladder L that is to be accommodated in the recess 14. It is also possible to adjust the spacer block 50 toward the carrier clamp, through the medium of the screw 54. Alternatively, spacer blocks of different sizes can be manufactured, and the purchaser of the carrier clamp can select a spacer block that will best suit his purposes.

In a typical installation, the clamps may appear as in FIG. 1, or as in FIG. 2. They would be located along the side of the vehicle, so that two crew members might quickly grasp the handle grips 34, and pull upwardly thereon, imparting a linear motion, that is, a motion in the direction of the axis of the plunger. The handle is pulled outwardly, in this straight path, for a distance sufficient to clear the supported ladder L, that is, the handle is pulled outwardly until the ladder L is clear of the shallow recess 48 formed in the closure element 32. Then, the handle is rotated as shown in FIGS. 1 and 2, until it is turned completely clear of the ladder, thus completely opening the recess 14 and permitting the ladder L to be lifted from both clamps.

When the closure element 32 is rotated clear of the ladder, it will remain in the position to which it is rotated, because the spring 46 will now be free to expand, to force the closure element against the distal end of the side portion 20.

When the ladder L is returned to position, the handles are first pulled outwardly against the spring restraint in the aforementioned linear motion, after which they are rotated into position extending across the supported ladder. The handles are then released, and under the force of the spring 46, they will be engaged firmly against the adjacent side rail of the folded fire ladder. The ladder enters the shallow recess 48 of the handle under these circumstances.

When the ladder is engaged by the handle in this way, spring 46, tending to expand, urges the closure element 32 to the left in FIG. 3, forcing the ladder against the inclined cam surface of the nose 52 of spacer 50. This causes the ladder to be bound securely within the carrier clamps, so that it will not rattle about loosely during operation of the fire truck or other emergency vehicle.

It will be understood that both the spacer block and the closure element 32 can, if desired, be suitably padded to prevent damage to the ladder and to further assure against rattling or excessive vibration.

As previously noted, spacer blocks of different sizes can be used. However, the closure element itself as will be readily understood, adjusts to the overall width of the ladder, after a particular spacer block has been selected, since the coil spring can compress to a substantial degree, and will in every instance cause the closure element to bind itself against the ladder when the closure element is in the clamping position thereof shown in FIGS. 3-5.

The device, as previously indicated, is used with different makes of fire ladders, so that there is no need to manufacture a carrier clamp for use with one make of fire ladder and one make only. Instead, the clamp is a universal clamp, which can be quickly adapted, either by insertion or removal of the spacer block, to accommodate ladders of different folded widths.

Further versatility is incorporated in the carrier clamp, through the arrangement which permits the mounting plate 28 to be attached either to the side or to the end of the clamp, and the further arrangement whereby the clamp can be mounted to open either vertically, or laterally, whichever is desired.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A carrier clamp for fire ladders, comprising:
   (a) a body having a ladder-receiving recess;
   (b) means for mounting said body on a support surface of an emergency vehicle;
   (c) a closure element for said recess, mounted upon the body for movement between a first position in which it closes the recess to confine the supported ladder therein, and a second position in which it is shifted clear of the recess to permit removal of the ladder; and
   (d) means normally biasing the closure element toward the body when in its first position, so as to clampably engage the supported ladder therebetween, said clamp further including a spacer block adapted to be mounted in the body, within the ladder-receiving recess, whereby to adjust the size of the recess to different widths of folded fire ladders, the spacer block having a cam surface adapted to bear against a supported fire ladder so as to bias the ladder into engagement with a sidewall of the ladder-receiving recess.

2. A carrier clamp for fire ladders, as in claim 1, wherein the means for biasing the closure element toward the body exerts a force upon the closure element oblique to the cam surface, whereby the ladder is shifted transversely by the biased closure element into engagement with the cam surface and is thereby caused to be then shifted laterally into engagement with a sidewall of the ladder-receiving recess.

3. A carrier clamp for fire ladders as in claim 1 wherein the spacer block is formed at one side thereof with a nose projecting forwardly toward the closure element and having an inclined face defining said cam surface.

4. A carrier clamp as in claim 3 wherein the inclined face of said nose extends obliquely to said sidewall of the recess and cooperates therewith to progressively reduce the width of the ladder-receiving recess in the direction in which said closure element is biased.

5. A carrier clamp for fire ladders, comprising:
   (a) a body having a ladder-receiving recess;
   (b) means for mounting said body on a support surface of an emergency vehicle;
   (c) a closure element for said recess, mounted upon the body for movement between a first position in which it closes the recess to confine the supported ladder therein, and a second position in which it is shifted clear of the recess to permit removal of the ladder;
   (d) means normally biasing the closure element toward the body when in its first position, so as to clampably engage the supported ladder therebetween; and
   (e) a cam surface in the recess adapted to bear against a supported fire ladder so as to bias the ladder into engagement with a sidewall of the ladder-receiving recess.

* * * * *